United States Patent
Joo

(10) Patent No.: US 6,915,719 B2
(45) Date of Patent: Jul. 12, 2005

(54) PEDAL RELEASE STRUCTURE OF A PARKING BRAKE

(75) Inventor: Myung-Jong Joo, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 145 days.

(21) Appl. No.: 10/291,340

(22) Filed: Nov. 7, 2002

(65) Prior Publication Data

US 2003/0084745 A1 May 8, 2003

(30) Foreign Application Priority Data

Nov. 7, 2001 (KR) .......................................... 2001-69094

(51) Int. Cl.[7] .................................................. G05G 5/06
(52) U.S. Cl. ............................... 74/542; 74/527; 74/529
(58) Field of Search .......................... 74/512, 513, 529, 74/542, 560, 527, 539

(56) References Cited

U.S. PATENT DOCUMENTS

| | | | |
|---|---|---|---|
| 4,036,078 A | 7/1977 | Muehling | |
| 4,281,736 A | 8/1981 | Lizzio | |
| 4,391,159 A | 7/1983 | Sellmeyer | |
| 4,441,380 A | 4/1984 | Kawaguchi et al. | |
| 4,462,487 A | 7/1984 | Warwick et al. | |
| 4,553,650 A | 11/1985 | Warwick et al. | |
| 4,604,913 A | * 8/1986 | Kyonomine | 74/529 |
| 4,949,592 A | 8/1990 | Yamazaki et al. | |
| 5,131,288 A | 7/1992 | Barlas | |
| 5,280,734 A | * 1/1994 | Riffle et al. | 74/529 |
| 5,309,786 A | 5/1994 | Paré et al. | |
| 5,588,335 A | 12/1996 | Strait | |
| 5,787,761 A | * 8/1998 | Wang | 74/535 |
| 5,794,492 A | 8/1998 | Paré | |
| 5,875,688 A | 3/1999 | Porter et al. | |
| 6,289,766 B1 | 9/2001 | Sukeshita et al. | |

* cited by examiner

Primary Examiner—David A. Bucci
Assistant Examiner—Bradley J. Van Pelt
(74) Attorney, Agent, or Firm—Morgan Lewis & Bockius LLP

(57) ABSTRACT

A pedal release structure for a parking brake is disclosed. The structure preferably includes a locking lever rotatably mounted on an assembly bracket, a resilient unit for resiliently supporting the locking lever in order to rotate the locking lever in an opposite direction from the return direction of the parking brake pedal, a rotation scope limiting unit for limiting the rotation scope of the locking lever, a locking unit for allowing a release lever to lock the locking lever according as the release cable is pulled, and a releasing unit for allowing the release lever locked by the locking lever to be released. With this structure the release lever is enabled to continue acting on a torsion spring until the parking brake pedal is completely released even when the return speed of the parking brake pedal is slowed due to cold temperature.

9 Claims, 4 Drawing Sheets

PEDAL RELEASE STRUCTURE OF A PARKING BRAKE

FIELD OF THE INVENTION

The present invention relates to a foot parking brake, and more particularly to a pedal release structure for a foot parking brake.

BACKGROUND OF THE INVENTION

A foot parking brake operates a rear brake assembly via a parking brake cable when a driver steps on the parking brake pedal. When a release knob connected to the parking brake pedal via a release cable is manipulated, the parking brake state is released.

In general, such a parking brake includes a foot pedal rotatably mounted to pull a brake cable in response to depression by the driver. Locking and return/release mechanisms are provided to maintain and release the braked state. Typically, the return/release mechanism includes a release knob that pulls a release cable. One or more springs and a damper are used to control the return motion of the pedal.

However, there are problems in parking brake assemblies thus constructed and operated. For example, the return speed of the parking brake pedal can rapidly slow down due to viscosity increase in the damper arising from cold weather operation. Also, frictional resistance increases in the rotating part of the parking brake pedal when it gets cold, thereby causing the parking brake pedal to be incompletely released. Thus, unless the driver holds the release knob out for an extended period, proper return of the pedal does not occur. There is therefore a need for an improved foot pedal operated parking brake release structure.

SUMMARY OF THE INVENTION

Embodiments of the present invention provide a pedal release structure for a parking brake that allows the release lever to continue pushing a torsion spring until the parking brake pedal is completely released. This preferably occurs even when the return speed of the parking brake pedal is slowed and frictional resistance is increased due to cold temperature.

In accordance with one embodiment of the present invention, a pedal release structure for a parking brake comprises a locking lever rotatably mounted on an assembly bracket. A resilient means is provided to resiliently support the locking lever to rotate the locking lever in an opposite direction from the return direction of depression of the parking brake pedal. A rotation scope limiting means is installed to limit the rotation of the locking lever. A locking means is mounted to allow a release lever to lock the locking lever as the release cable is pulled and a releasing means is provided to allow the release lever locked by the locking lever to be released.

In a further alternative embodiment, a foot pedal operated parking brake includes a bracket assembly, release cable for releasing the foot pedal from a depressed, brake-on position, and a torsion spring biasing the foot pedal toward an undepressed position. The release structure according to the invention comprises a locking lever rotatably mounted on the bracket assembly. The locking lever forms an open notch at one end and is rotationally biased in a direction toward the notch opening. A release lever is rotatably mounted on the assembly bracket. The release lever has a first end comprising a protruding portion that is configured and dimensioned to be engaged by the notch in response to manipulation of the release cable. In this embodiment, the lock lever preferably defines a sloped end adjacent the notch that is configured and dimensioned to facilitate sliding of the protruding portion into the notch. The opposite end of the release lever is configured to bear against an end of the torsion spring when engaged, for exerting a return biasing force on the brake pedal. A cam member is disposed on the brake pedal in a position to bear against the locking lever and disengage the release lever from the notch when the brake pedal returns to the undepressed position.

In a further preferred alternative embodiment, the release structure comprises a member disposed on the lock lever that is positioned to limit rotation of the lock member in the biased direction. The member disposed on the lock lever is configured and dimensioned to bear against the assembly bracket. The lock lever is mounted at a pivot point. A torsional resilient element biases the lock lever around the pivot point.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
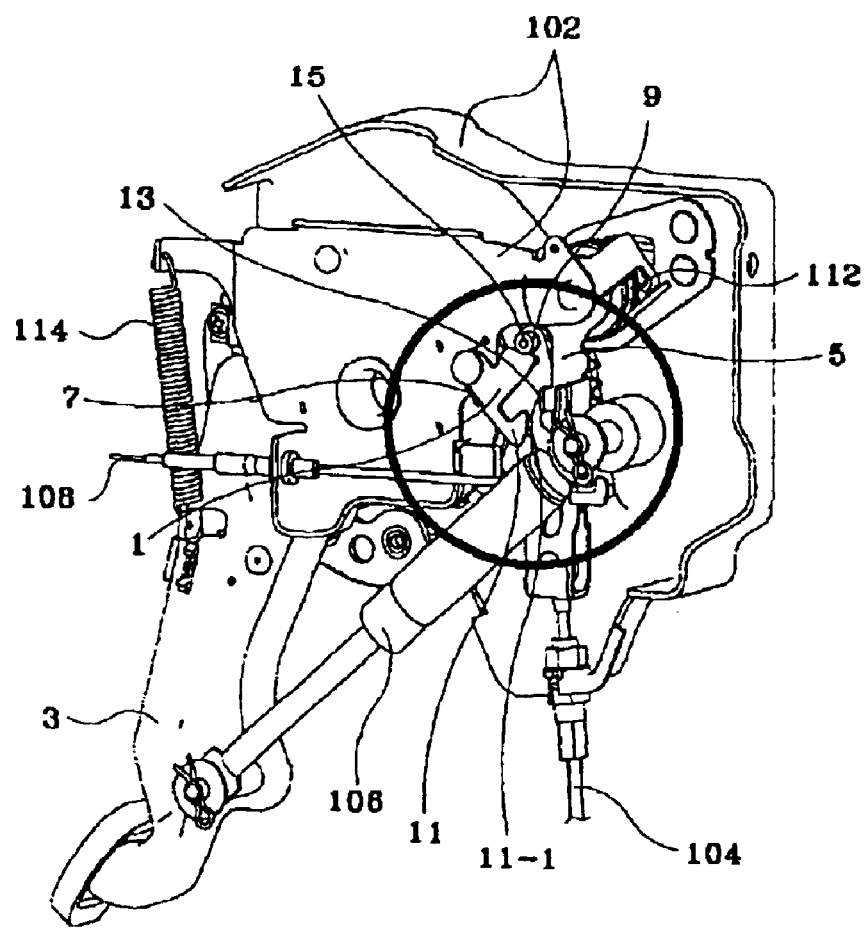
FIG. 1 is a perspective view illustrating an embodiment of a parking brake pedal assembly according to the present invention.

An embodiment of the present invention will be described in detail with reference to the accompanying drawings. Throughout the drawings, like reference numerals are used for designation of like or equivalent parts or portions as in the prior art for simplicity of explanation.

As shown in FIG. 1, in embodiments of the present invention, a parking brake pedal 3 is hinged to an assembly bracket 102 and connected to a rear brake assembly via a parking brake cable 104. The parking brake pedal assembly also includes a damper 106 for smoothing and softening return operation of the parking brake pedal 3. A release cable 108 transmits driver manipulation force from a release knob to release the parked state by pulling a release lever 5. The release lever 5 returns the parking brake pedal 3 to its original position according to operation of torsion spring 112 and tension spring 114. Release lever 5 includes at one end a flange that bears against spring 112. The mechanism for locking the pedal 3 in the depressed/brake-on position is conventional and not illustrated.

In the pedal release structure according to an embodiment of the invention, locking lever 1 is rotatably mounted on assembly bracket 102. A resilient means 7 is provided to resiliently support the locking lever 1 and rotate the locking lever 1 in an opposite direction from the return direction of parking brake pedal 3. A rotation scope limiting means 9 is mounted to limit rotation of locking lever 1 and a locking means 11 is installed to allow release lever 5 to lock the locking lever 1 as the release cable 108 is pulled. A releasing means 15 is provided to allow the release lever locked by the locking lever 1 to be released according to return state of the parking brake pedal 3.

Resilient means 7 can be formed by a locking torsion spring having a coil part encompassing the rotary shaft of the locking lever 1. Spring 7 thus preferably resiliently supports the locking lever 1 in a counterclockwise direction. Rotation scope limiting means 9 may comprise a stopper formed by folding over a part of the locking lever 1 to form a flange that bears against assembly bracket 102.

Locking means 11 preferably includes a notch formed in the locking lever 1 and a hitching protruder 13 formed on the release lever 5. The notch is formed to allow the hitching protruder 13 to slide on a slope 11-1 and to easily pass over and into the notch when the release lever 5 is rotated towards the locking lever 1, but prevent the release lever 5 from rotating in the opposite direction thereof.

Release means 15 may be formed by a stopper mounted on the parking brake pedal 3. The stopper acts as a cam member to rotate the locking lever 1 to cause the notch 11 to be detached from the hitching protruder 13 of the release lever 5 when the parking brake pedal 3 is returned to a return completion point, i.e., undepressed position.

When the parking brake pedal 3 is depressed, it rotates and compresses the damper 106 such that the parking brake cable 104 is pulled, thereby operating the rear brake assembly to place the vehicle in a parked state. When the release knob is manipulated, the release cable 108 is pulled to prompt the parking brake pedal 3 to return to its original position under action of the torsion spring 112 and tensile spring 114, thereby releasing the parking brake cable 104 and releasing the braking power.

Figure 2:
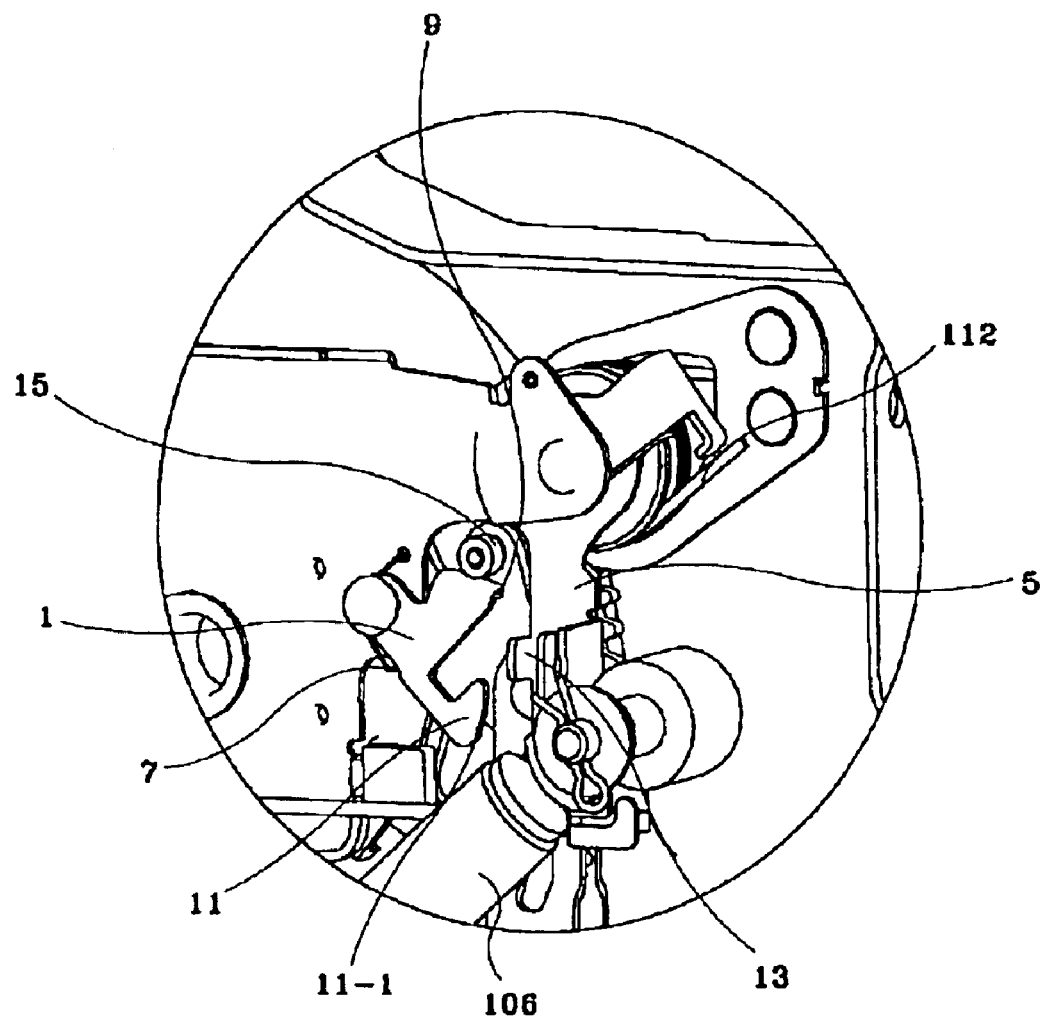
FIG. 2 is a schematic view of the encircled portion of FIG. 1 illustrating a state where the parking brake pedal is not depressed.

More specifically, FIG. 2 shows the parking brake pedal 3 not depressed, which is the state maintained while a vehicle is normally in motion. In this state, the stopper 15 pushes the locking lever 1 in the clockwise direction and the release lever 5 is free with respect to the locking lever 1.

Figure 3:
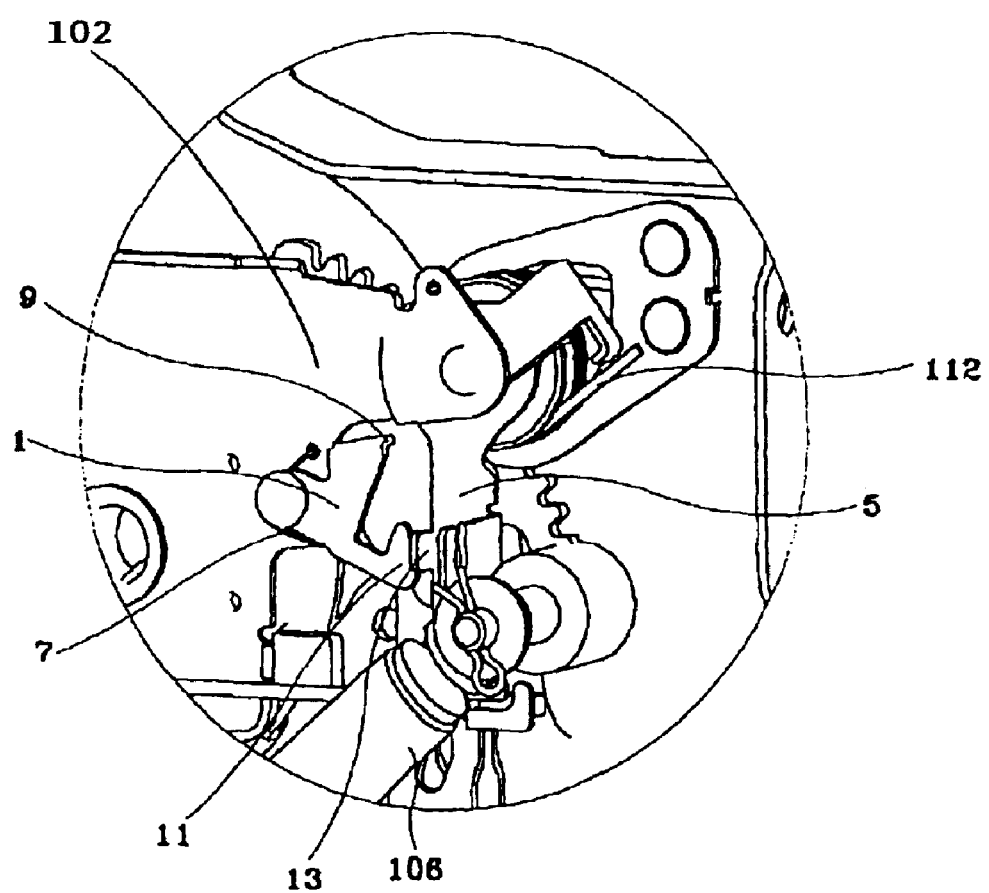
FIG. 3 is a schematic view of the encircled portion of FIG. 1 illustrating a state where the parking brake pedal is depressed.

When the parking brake pedal 3 is depressed, the pedal 3 rotates counterclockwise to the state as shown in FIG. 3. The stopper 15 moves along with the rotation of the parking brake pedal 3 to be positioned behind the assembly bracket 102. As a result, the locking lever 1 rotates counterclockwise so that stopper 9 contacts the assembly bracket 102 to limit rotation. In this state the parking brake is in operation.

Figure 4:
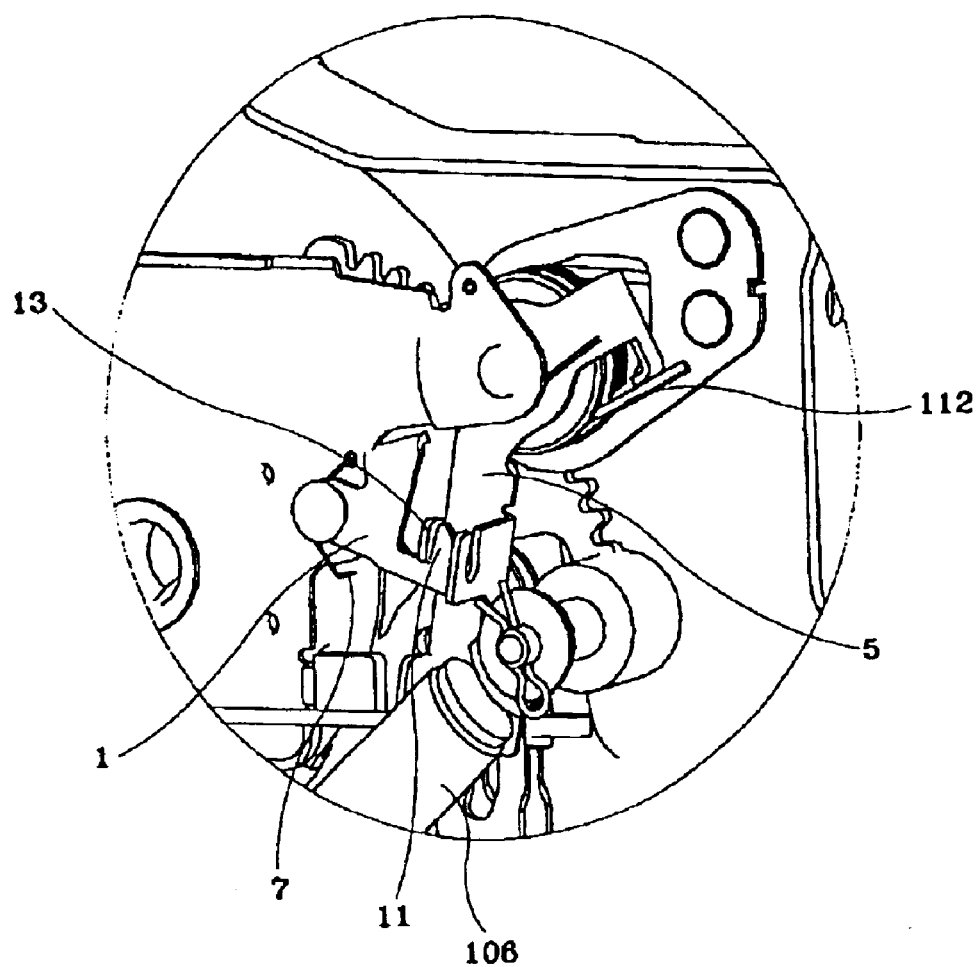
FIG. 4 is a schematic view of the encircled portion of FIG. 1 illustrating a state in which the release knob has been manipulated by a driver.

When the release knob is operated, release cable 108 rotates the release lever 5 clockwise to reach the state illustrated in FIG. 4. To reach this state, the hitching protruder 13 of the release lever 5 moves along slope 11-1 of the notch 11 and is captured by the notch in response to manipulation of the release knob. As a result, the release lever 5 maintains the state of being captured by the notch 11 of the locking lever 1. The end of release lever 5 opposite hitching protruder 13 thus continues to act against torsion spring 112, even after the release knob is let go of by the driver. Torsion spring 112 therefore continues to bias the parking brake pedal 3 toward the undepressed position. This allows the parking brake pedal to return fully, regardless of the release knob operation time by the driver.

When the parking brake pedal 3 reaches the return completion point, the release lever 5 moves back to the original position. This occurs when the stopper 15 rotates clockwise to push the locking lever 1 clockwise. Thus, the notch 11 releases the hitching protruder 13 at a point when the parking brake pedal 3 is completely returned, thereby allowing the release lever 5 to return to the original position (see FIG. 2).

As described above, when the hitching protruder 13 is captured by the notch 11 due to release knob manipulation, the torsion spring 112 biases the return of the parking brake pedal 3 until the parking brake pedal 3 is fully returned. Therefore, there is no occurrence of the parking brake pedal 3 not being fully returned even if there is a delay of damper 106 due to drop in temperature or frictional resistance increase of the rotating part of the parking brake pedal.

What is claimed is:

1. A pedal release structure for a pedal operated parking brake, comprising:
    a locking lever rotatably mounted on an assembly bracket;
    resilient means for resiliently supporting the locking lever in order to rotate the locking lever in a direction opposite from a return direction of the parking brake pedal;
    rotation scope limiting means for limiting the rotation of the locking lever;
    locking means for allowing the locking lever to lock a release lever as a release cable is pulled; and
    releasing means for allowing the release lever locked by the locking lever to be released, wherein the locking means comprises a latch protruder disposed on the locking lever and a hitching protruder disposed on the release lever, wherein the release means comprises a stopper mounted on the parking brake pedal for rotating the locking lever to cause the latch protruder to be detached from the hitching protruder of the release lever when the parking brake pedal is returned.

2. The structure as defined in claim 1, wherein the rotation scope limiting means comprises a stopper formed by folding a part of the locking lever to be hitched at the assembly bracket.

3. The structure as defined in claim 1, wherein the resilient means comprises a lock torsion spring mounted between the locking lever and the assembly bracket.

4. A release structure for a foot pedal operated parking brake, the parking brake including an assembly bracket on which the foot pedal is rotatably mounted, a release cable for releasing the foot pedal from a depressed, brake-on position, and a torsion spring biasing the foot pedal toward an undepressed position, said release structure comprising:
    a locking lever rotatably mounted on the bracket assembly, the locking lever forming an open notch at one end and being rotationally biased in a direction toward the notch opening;
    a release lever rotatably mounted on the assembly bracket, the release lever having a first end configured to be engaged by said notch in response to manipulation of the release cable, and an opposite end configured to bear against an end of the torsion spring when so engaged for exerting a return biasing force on the brake pedal; and
    a cam member disposed on the brake pedal in a position to bear against the locking lever and disengage the release lever from said notch when the brake pedal returns to the undepressed position.

5. The release structure of claim 4, further comprising a member disposed on the lock lever and positioned to limit rotation of the lock member in the biased direction.

6. The release structure of claim 5, wherein said member disposed on the lock lever is configured and dimensioned to bear against the assembly bracket.

7. The release structure of claim 4, wherein the lock lever is mounted at a pivot point and a torsional resilient element biases the lock lever around said point.

8. The release structure of claim 4, wherein said first end comprises a protruding portion configured and dimensioned to be received in the notch.

9. The release structure of claim 8, wherein said locking lever defines a sloped end adjacent said notch configured and dimensioned to facilitate sliding of the protruding portion into said notch.

* * * * *